(12) United States Patent
Sakai et al.

(10) Patent No.: US 6,810,984 B2
(45) Date of Patent: Nov. 2, 2004

(54) OCCUPANT JUDGING APPARATUS

(75) Inventors: Morio Sakai, Toyota (JP); Koji Aoki, Nagoya (JP); Osamu Fujimoto, Nisshin (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 54 days.

(21) Appl. No.: 10/137,451

(22) Filed: May 3, 2002

(65) Prior Publication Data

US 2002/0175490 A1 Nov. 28, 2002

(30) Foreign Application Priority Data

May 8, 2001 (JP) ........................................ 2001-137412

(51) Int. Cl.$^7$ ............................................ B60K 28/00
(52) U.S. Cl. ..................................................... 180/273
(58) Field of Search ........................... 180/273; 280/735

(56) References Cited

U.S. PATENT DOCUMENTS

| | | | | | |
|---|---|---|---|---|---|
| 6,024,378 | A | * | 2/2000 | Fu ............................... | 280/735 |
| 6,218,632 | B1 | * | 4/2001 | McCarthy et al. ........... | 177/144 |
| 6,242,701 | B1 | * | 6/2001 | Breed et al. ................. | 177/144 |
| 6,323,444 | B1 | * | 11/2001 | Aoki ........................... | 177/144 |
| 6,348,663 | B1 | * | 2/2002 | Schoos et al. ............... | 177/144 |
| 6,356,200 | B1 | * | 3/2002 | Hamada et al. .............. | 340/667 |
| 6,397,688 | B1 | * | 6/2002 | Sakamoto et al. ...... | 73/862.637 |
| 6,467,804 | B2 | * | 10/2002 | Sakai et al. .................. | 280/735 |
| 6,509,653 | B2 | * | 1/2003 | Fujimoto et al. ........... | 307/10.1 |
| 6,561,300 | B1 | * | 5/2003 | Sakamoto et al. ........... | 180/273 |
| 6,577,142 | B2 | * | 6/2003 | Eisenmann et al. ......... | 324/674 |
| 6,609,055 | B2 | * | 8/2003 | Stanley ........................ | 701/45 |
| 6,653,577 | B2 | * | 11/2003 | Breed et al. ................. | 177/144 |

FOREIGN PATENT DOCUMENTS

JP           9-207638 A      8/1997

* cited by examiner

*Primary Examiner*—Thomas Price
(74) *Attorney, Agent, or Firm*—Burns, Doane, Swecker & Mathis, L.L.P.

(57) ABSTRACT

An occupant judging apparatus for a vehicle seat includes a load sensor assembled to a seat body, a controller for calculating a detected load value based upon an output load value of the load sensor and for performing an occupant judgment based upon a difference between the detected load value and a predetermined judging threshold value, and human body detecting means for detecting a human body approximately in contact with the seat body. The controller controls the occupant judgment based upon the detected load value and the predetermined judging threshold value in response to the detecting status of the human body by the human body detector.

19 Claims, 8 Drawing Sheets

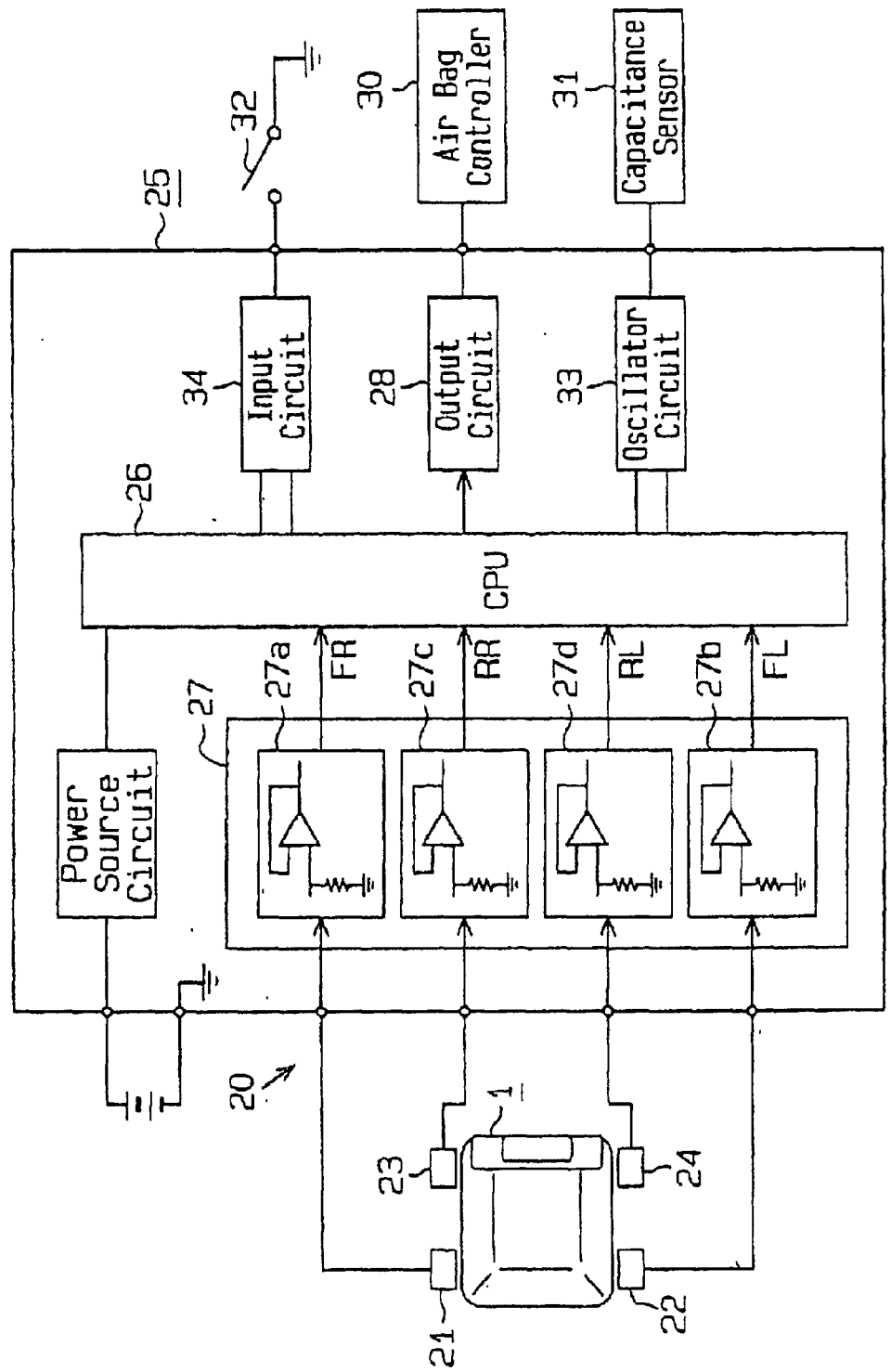

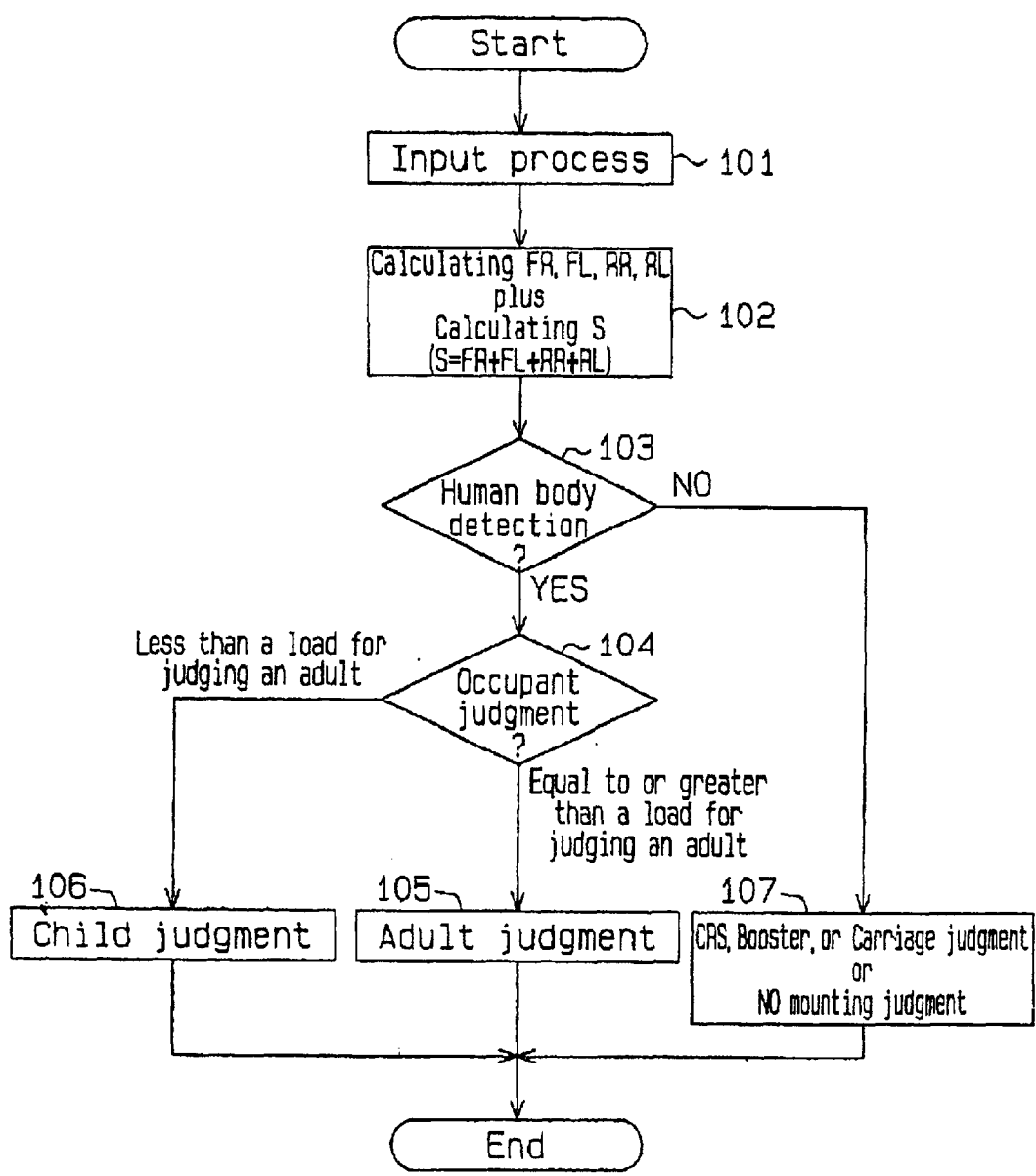

Adult Sitting

Child Sitting

CRS Provided

Booster Provided

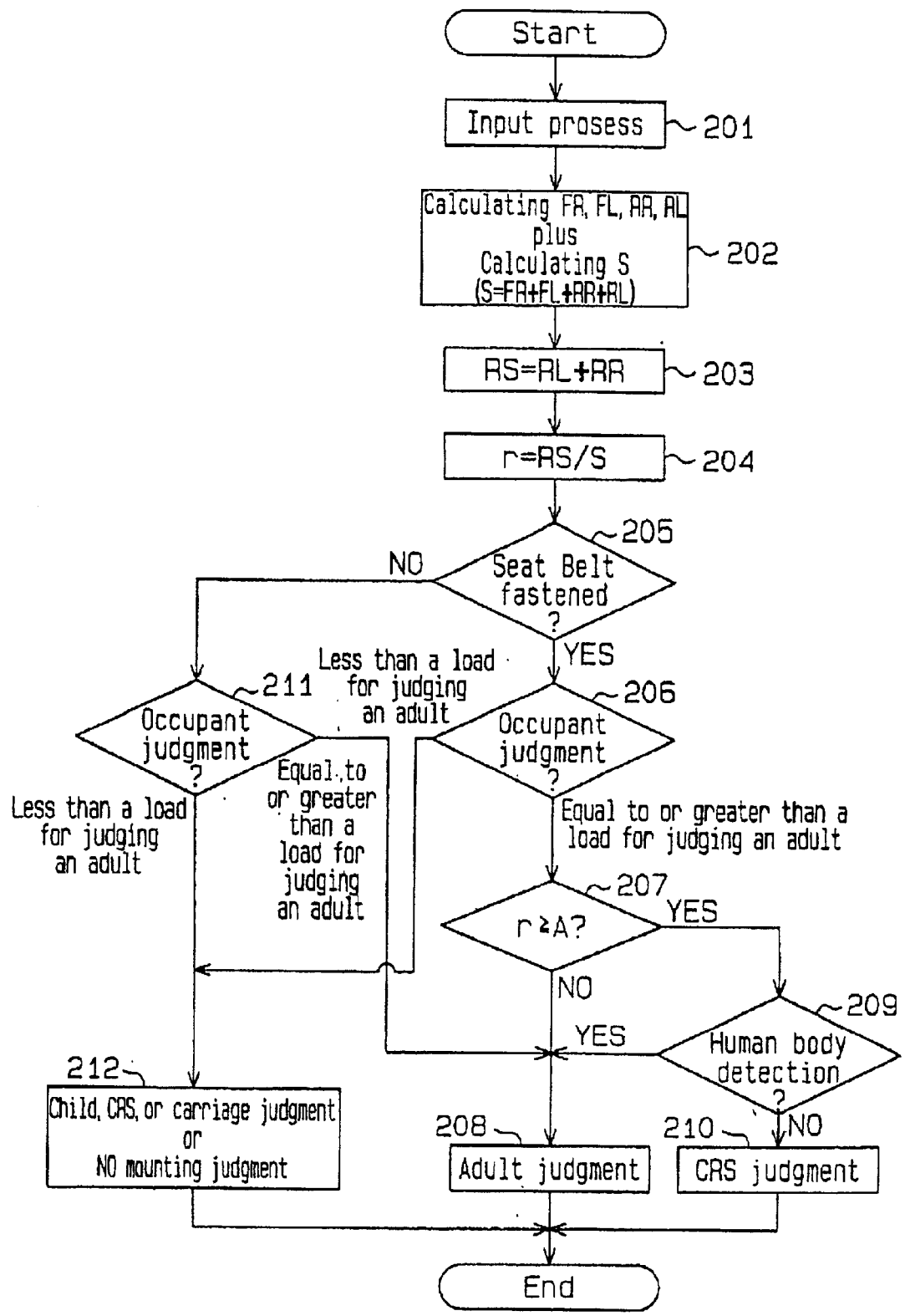

Adult Sitting

CRS Provided In A Forward Direction

CRS Provided In A Rearward Direction

OCCUPANT JUDGING APPARATUS

CROSS REFERENCE TO RELATED APPLICATIONS

This application is based on and claims priority under 35 U.S.C. § 119 with respect to a Japanese Patent Application 2001-137412, filed on May 8, 2001, the entire content of which is incorporated herein by reference.

FIELD OF THE INVENTION

This invention generally relates to an occupant judging apparatus. More particularly, this invention pertains to an occupant judging apparatus operated based upon an output load value from a load sensor mounted on a vehicle body.

BACKGROUND OF THE INVENTION

According to a vehicle provided with a known air bag for protecting a sitting occupant on a vehicle seat, an occupant judging apparatus is mounted on the vehicle seat for judging whether or not there is an occupant on the vehicle seat. One of the known occupant judging apparatus has been disclosed, for example in a Japanese Laid-open Patent Publication No.9(1997)-207638. The occupant judging apparatus includes plural load sensors and a controller. The plural load sensors are secured to plural portions for assembling the vehicle seat to a vehicle floor, respectively. The controller is employed for calculating a detected load value based upon each output load value from each load sensor and for judging whether or not there is an occupant on the vehicle seat based upon the detected load value. More specifically, the controller is further provided with an adding device and a judging process circuit. The adding device serves for adding each output load value from each load sensor so as to calculate the detected load value. The judging process circuit serves for comparing the detected load value with a predetermined load value (a judging threshold value). Accordingly, the controller can judge whether or not there is an occupant on the vehicle seat based upon a difference between the detected load value and the threshold value.

However, the following problem may occur according to the above described occupant judging apparatus, in which an only criteria for judging whether or not there is an occupant on the vehicle seat is the difference between the detected load value and the threshold value. Assuming that a child restraint system is provided on the vehicle seat, a load for fastening a seat belt may be generated to fix the child restraint system to the vehicle seat, in which the detected load value may be increased by the load for fastening the seat belt. Therefore, the occupant judging apparatus may misjudge that an adult occupant is seated on the vehicle seat.

Therefore, the above disclosed occupant judging apparatus is still susceptible of certain improvements with respect to providing an improved occupant judging apparatus for restraining an occupant misjudgment.

SUMMARY OF THE INVENTION

According to an aspect of the present invention, an occupant judging apparatus comprises load detecting means assembled to a seat body, a controller for calculating a detected load value based upon an output load value of the load detecting means and for performing an occupant judgment based upon a difference between the detected load value and a predetermined judging threshold value. The occupant judging apparatus according to the present invention further comprises human body detecting means for detecting a human body approximately in contact with the seat body, and the controller controlling the occupant judgment based upon the detected load value and the predetermined judging threshold value in response to the detecting status of the human body by the human body detecting means. The human body detecting means can be provided at a seat cushion or at a seat back.

According to another aspect of the present invention, the load detecting means includes a front load sensor for detecting a load applied to a front portion of the seat body and a rear load sensor for detecting a load applied to a rear portion of the seat body. The controller includes calculating means for calculating a ratio between an output load value of the rear load sensor and an output load value of the front load sensor, wherein the human detection is performed by the human body detecting means in response to the calculated ratio.

BRIEF DESCRIPTION OF THE DRAWING FIGURES

The foregoing and additional features and characteristics of the present invention will become more apparent from the following detailed description considered with reference to the accompanying drawing figures wherein:

FIG. 4 is a bock view illustrating an electric structure of an occupant judging apparatus provided in the vehicle seat according to the first embodiment of the present invention;

FIG. 5 is a flow chart describing an occupant judging operation according to the first embodiment of the present invention;

FIG. 8 is a flow chart describing an occupant judging operation according to the second embodiment of the present invention.

DETAILED DESCRIPTION OF THE INVENTION

Figure 1:
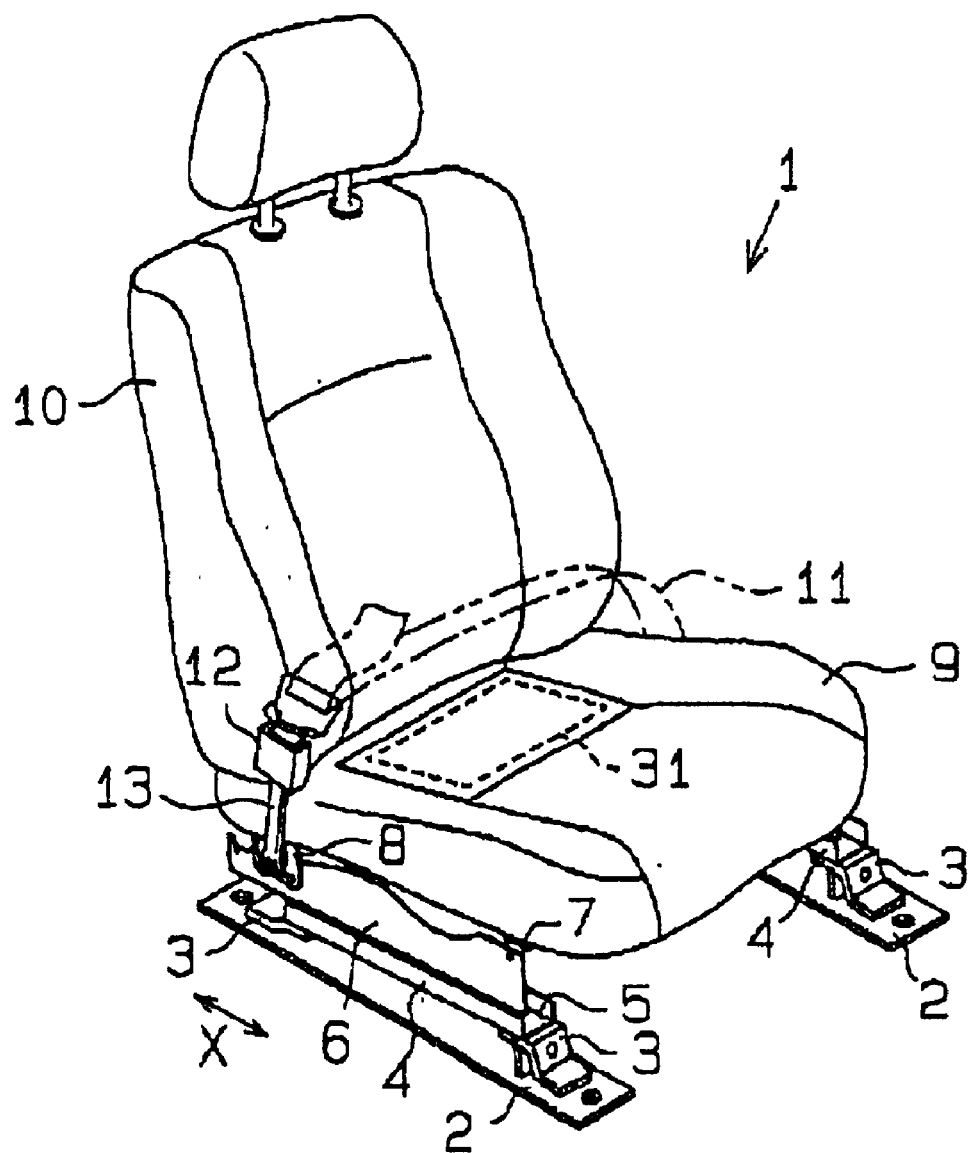
FIG. 1 is a perspective view illustrating a vehicle seat according to a first embodiment of the present invention when the vehicle seat is viewed from a diagonally forward outside portion of the vehicle.

With reference to FIG. 1, a seat body 1 according to a first embodiment of the present invention is arranged at a side of a vehicle passenger seat and is provided with right and left supporting frames 2 which form one pair in a widthwise direction of the seat body 1. The right and left supporting frames 2 are fixed to a vehicle flow (not shown) and extend in parallel with each other in a vehicle longitudinal direction as indicated with an arrow X. Right and left rails 4 forming one pair in the widthwise direction thereof are supportably fixed to right and left brackets 3 each of which form one pair in a vehicle longitudinal direction and are assembled on the supporting frames 2. The lower rails 4 have a cross section and a substantially U-shaped structure, respectively. Upper portions of the lower rails 4 have openings forming right and left sliding grooves 5 which form one pair and extend in the vehicle longitudinal direction, respectively.

Figure 2:
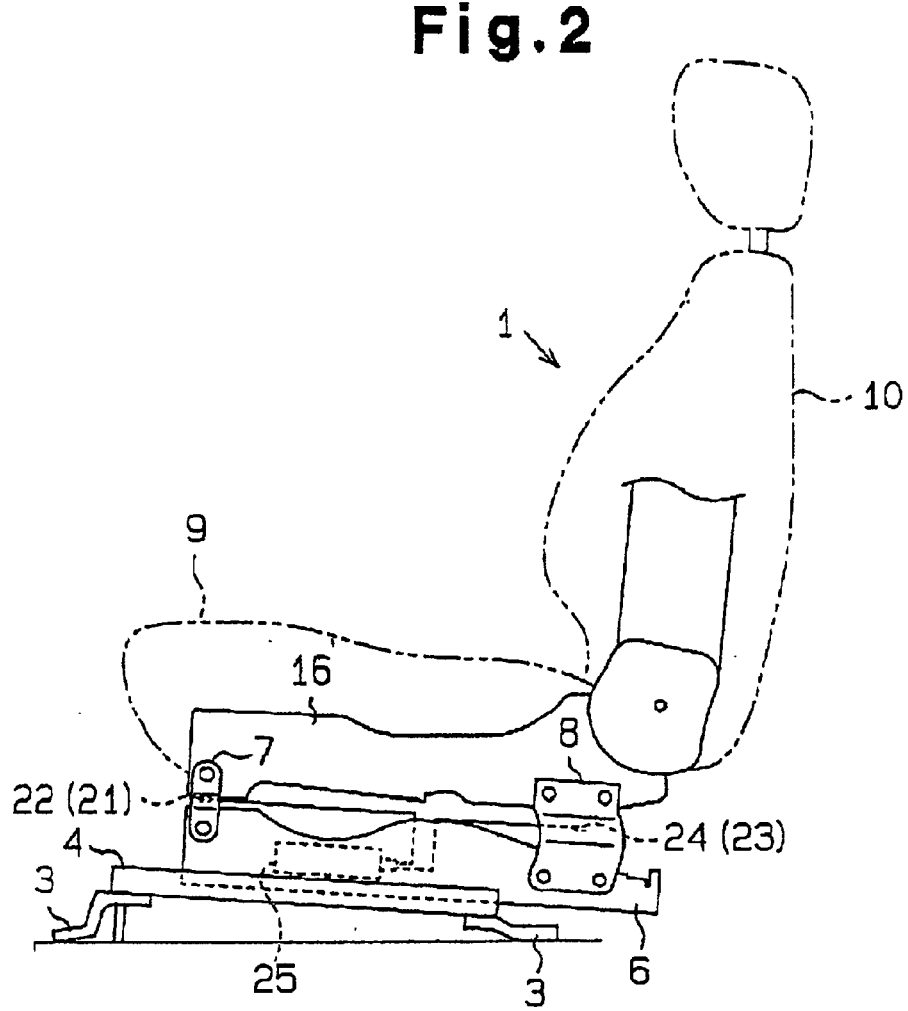
FIG. 2 is a schematic side view illustrating the vehicle seat illustrated in FIG. 1.

Right and left upper rails 6 which form one pair are disposed in the sliding grooves 5 to be slidably moved along the sliding grooves 5 in the vehicle longitudinal directions. As illustrated in FIG. 2, the upper rails 6 are connected to right and left lower arms 16 which form one pair and support a seat cushion 9 and a seat back 10, via right and left front side sensor brackets 7 and right and left rear side sensor brackets 8. Further, there is a predetermined distance between each upper rail 6 and each lower arm 16.

Figure 3A:
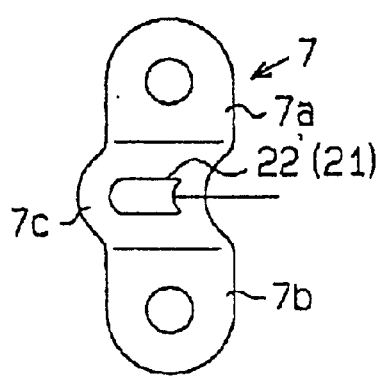
FIG. 3 is a front view illustrating a front side sensor bracket and a rear wide sensor bracket fixed to one side of the vehicle seat illustrated in FIG. 2.
Figure 3B:
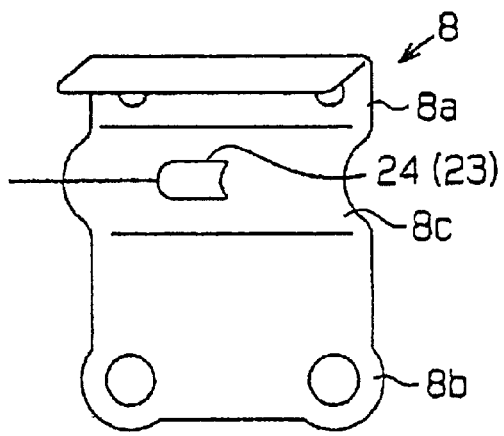

As described in FIG. 3(*a*), each front side sensor bracket 7 is fixed to each lower arm 16 at an upper side jointing portion 7*a* of the front side sensor bracket 7. Further, each front side sensor bracket 7 is fixed to each upper rail 6 at a lower side jointing portion 7*b* thereof. Each front side sensor bracket 7 is provided with a deformed portion 7*c* between the upper and lower jointing portions 7*a* and 7*b*. A front-right side load sensor 21 and a front-left side load sensor 22 which form a front load sensor (load detecting means) are attached to the deformed portions 7*c* of the front side sensor brackets 7. Each front-right side load sensor 21 and front-left side load sensor 22 is provided, for example with an element for detecting a deformation such as a strain gauge. Therefore, the front load sensor including the front-right side load sensor 21 and the front-left side load sensor 22 can electrically detect a deformed amount of each deformed portion 7*c* relative to a load applied to the seat cushion 9.

As described in FIG. 3(*b*), each rear side sensor bracket 8 is fixed to each lower arm 16 at an upper side jointing portion 8*a* of the rear side sensor bracket 8. Further, each rear side sensor bracket 8 is fixed to each upper rail 6 at a lower side jointing portion 8*b* thereof. Each rear side sensor bracket 8 is provided with a deformed portion 8*c* between the upper and lower jointing portions 8*a* and 8*b*. A rear-right side load sensor 23 and a rear-left side load sensor 24 which form a rear load sensor (load detecting means) are attached to the deformed portions 8*c* of the rear side sensor brackets 8. Each rear-right side load sensor 23 and rear-left side load sensor 24 is provided, for example with the element for detecting the deformation such as the strain gauge. Therefore, the rear load sensor including the rear-right side load sensor 23 and the rear-left side load sensor 24 can electrically detect a deformed amount of each deformed portion 8*c* relative to the load applied to the seat cushion 9.

As illustrated in FIG. 1, an upper rail 6 at the right side of the seat body 1 is connected to an anchor bracket 13 of a belt anchor 12 connecting a seat belt 11. Further, a capacitance sensor 31 as human body detecting means is disposed in an approximately central portion of the seat cushion 9. The capacitance sensor 31 serves for detecting a variation of the capacitance generated between the seat cushion 9 and an obstacle being in contact with the seat cushion 9 so as to detect back parts of an occupant. The seat cushion 9 and the obstacle are defined to be approximately in contact with each other not only when the obstacle is fully in contact with the seat cushion 9 but also when the obstacle is located within a predetermined range to be detected by the capacitance sensor 31. A sensibility of the capacitance sensor 31 is set not to be almost influenced with the load applied to the seat body 1.

With reference to FIG. 4, an occupant judging apparatus 20 provided for the vehicle seat body 1 includes the load sensors 21, 22, 23, 24, a controller 25, the capacitance sensor 31, and a seat belt switch 32. The controller 25 includes a central processing unit (hereinafter, referred to as a CPU) 26, a sensor signal input circuit 27, an output circuit 28, an oscillator circuit 33, and an input circuit 34. The sensor signal input circuit 27 is provided with active filters 27*a*, 27*b*, 27*c*, 27*d* provided for the corresponding load sensors 21, 22, 23, 24. Load signals from the load sensors 21, 22, 23, 24 are inputted to the CPU 26 via the active filters 27*a*, 27*b*, 27*c*, 27*d*. Each active filter 27*a*, 27*b*, 27*c*, 27*d* is a known low-pass filter combined with a passive element made of a condenser, a resistance and an active element such as an amplifier. Therefore, ranges with low-pass frequency among the respective load signals from the respective load sensors 21, 22, 23, 24 can be transmitted via the active filters 27*a*, 27*b*, 27*c*, 27*d* and the other ranges can be cut off via the active filters 27*a*, 27*b*, 27*c*, 27*d*.

The CPU 26 calculates an output load value FR of the front-right side load sensor 21 and an output load value FL of the front-left side load sensor 22 based upon each load signal passed through each active filter 27*a*, 27*b* from each load sensor 21, 22. Further, the CPU 26 calculates an output load value RR of the rear-right side load sensor 23 and an output load value RL of the rear-left side load sensor 24 based upon each load signal passed through each active filter 27*c*, 37*d* from each load sensor 23, 24. A detected load value S is then calculated by summing these four output load values FR, FL, RR, RL.

The oscillator circuit 33 serves for inputting a detected signal by the capacitance sensor 31 to the CPU 26. That is, the variation of the capacitance detected by the capacitance sensor 31 is inputted as a variation of a resonance frequency to the CPU 26 via the oscillator circuit 33. Therefore, a human body can be detected based upon the variation of the resonance frequency.

The seat belt switch 32 is turned ON by fitting the seat belt 11 into the belt anchor 12. A fastened condition of the seat belt 11 is therefore detected by inputting a detected signal (ON or OFF) from the seat belt switch 32 to the CPU 26 via the input circuit 34.

The CPU 26 performs various calculating processes based upon a predetermined control program and an initial data and outputs the calculated result, i.e. an occupant judging result, into the output circuit 28. Accordingly, for example, an operation of an air back apparatus is controlled by outputting the calculated result to an air back controller 30 via the output circuit 28.

Next, an operating routine of an occupant judgment according to the first embodiment of the present invention is described below with reference to a flow chart illustrated in FIG. 5. The operating routine is performed by interrupting at a predetermined time of period.

An initial process is first performed by the CPU 26 at step 101. More specifically, each load signal from each sensor 21, 22, 23, 24 filtered by the sensor signal input circuit 27 is inputted by the CPU 26. At step 102, the CPU 26 calculates each output load value FR, FL, RR, RL based upon each load signal from each load sensor 21, 22, 23, 24 so as to be memorized by a memory (not shown). The CPU 26 further calculates the detected load value S by summing the output load value FR, FL, RR, RL. The detected load value S is memorized by the memory (not shown). The program then proceeds to step 103 for judging whether or not a human body can be detected. That is, the CPU 26 judges whether or not the resonance frequency based upon the detected signal passed through the oscillator circuit 33 from the capacitance sensor 31 corresponds to a resonance frequency of a human body.

Figure 6A:
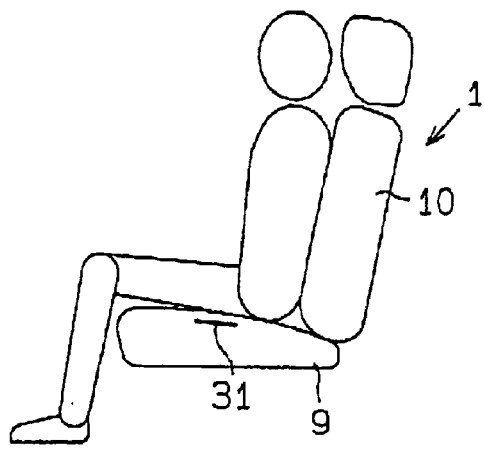
FIG. 6 is a schematic view illustrating a vehicle seat condition under each process based upon the flow chart illustrated in FIG. 5.

When an affirmative judgment (YES) is obtained at step 103, i.e. when the CPU 26 judges that a human body has been detected, the program is followed by step 104. At step 104, the CPU 26 judges the occupant on the seat body 1. For example, when the detected load value S is equal to or greater than a predetermined adult occupant load value which judges that an adult occupant is seated on the seat body 1, the program proceeds to step 105 for judging that an adult occupant is seated. In this case, the human body has been detected and a sufficiently large load value for judging that an adult occupant is seated has been detected. Therefore, the CPU 26 judges an adult occupant sitting condition as illustrated in FIG. 6(a). The judging result is memorized by the memory and the program is terminated.

Figure 6B:
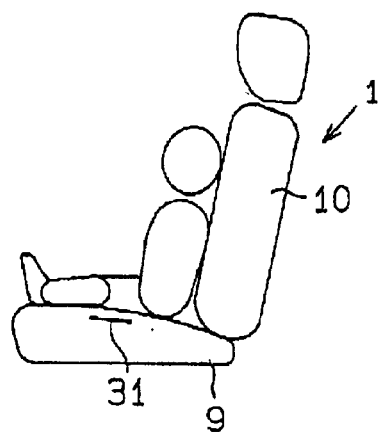

At step 104, for example, when the detected load value S is less than the predetermined adult load value, the program proceeds to step 106 for judging to be a child. In this case, the human body has been detected, and yet the sufficiently large load value for judging to be an adult occupant has not been detected. Therefore, the CPU 26 judges a child sitting condition as illustrated in FIG. 6(b). The judging result is memorized by the memory and the program is terminated.

Figure 6C:
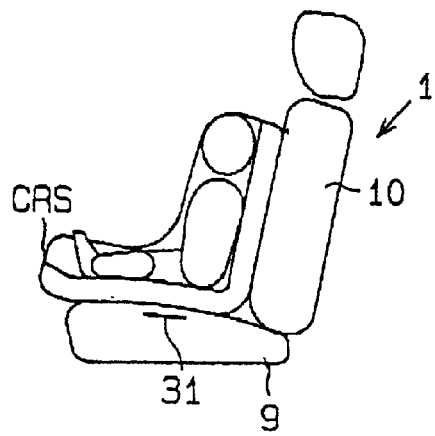
Figure 6D:
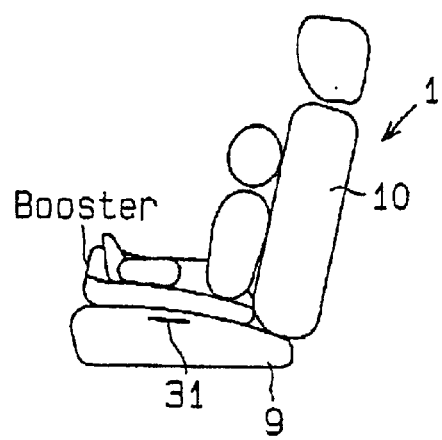

On the other hand, when a negative judgment (NO) is obtained at step 103, i.e. when the human body is not detected, the program is followed by step 107. At step 107, the CPU 26 judges at least that there is no human body on the seat body 1, and yet there is a child restraint system (CRS), a booster seat (hereinafter, referred to as a booster), a baggage on the seat body 1 and so on. Further, the CPU 26 judges at least that there is nothing being mounted on the seat body 1. That is, there is no human body detected by the capacitance sensor 31. Therefore, the CPU 26 judges a condition provided with the CRS as illustrated in FIG. 6(c) or a condition provided with the booster as illustrated in FIG. 6(d). The CRS and the booster can not be detected as a human body since each of them are made, for example of resin. The judging result is memorized by the memory and the program is terminated.

As described above, even when the detected load value S increased by the fastening load of the seat belt 11 for fixing the CRS is sufficiently large for judging to be an adult occupant, the misjudgment that an adult occupant is seated can be prevented unless the human body is detected by the capacitance sensor 31. Therefore, the occupant judging apparatus according to the first embodiment of the present invention can restrain an occupant misjudgment.

Further, according to the first embodiment of the present invention, the detection of the human body can be performed simply by detecting the capacitance.

Further, the occupant judging apparatus can judge that there is not a human body on the seat body 1. That is, the occupant judging apparatus can judge that there is the CRS, the booster, the carriage, and so on being mounted on the seat body 1 or that there is nothing being mounted thereon. Therefore, an unnecessary operation of an air bag can be prevented.

Figure 7:
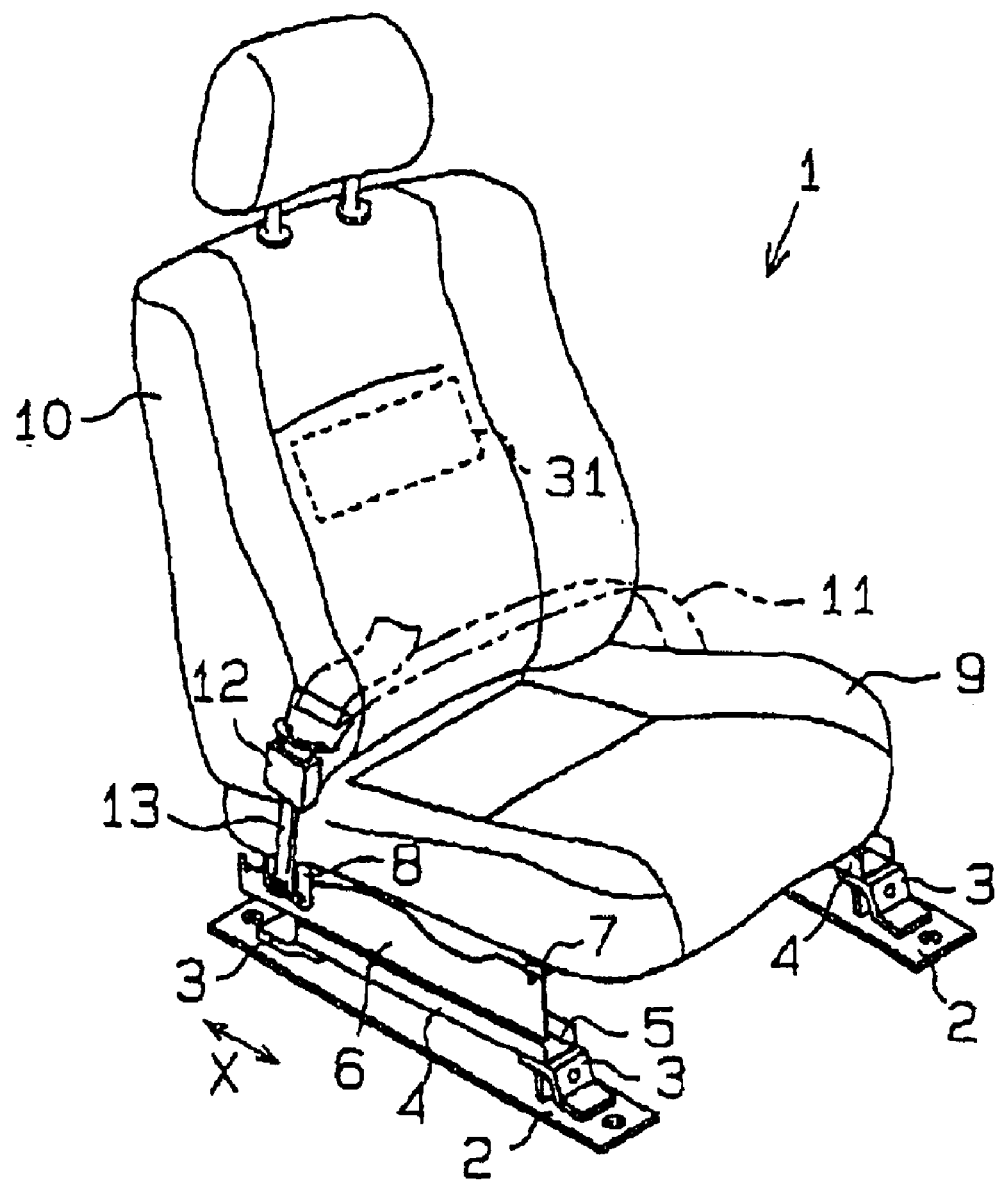
FIG. 7 is a perspective view illustrating a vehicle seat according to a second embodiment of the present invention when the vehicle seat is viewed from a diagonally forward outside portion of the vehicle.

Hereinafter, the occupant judging apparatus according to a second embodiment of the present invention can be described as follow. The occupant judging apparatus according to the second embodiment of the present invention is different from the occupant judging apparatus according to the first embodiment of the present invention with respect to a located position of the capacitance sensor 31. The capacitance sensor 31 according to the second embodiment is provided in the seat back 10 as illustrated in FIG. 7, in substitution for being provided in the seat cushion 9 according to the first embodiment. The capacitance sensor 31 serves for detecting a human body based upon the output load value of the rear-right side load sensor 23 and the rear-left side load sensor 24 relative to the output load value of the front-right side load sensor 21 and the front-left side load sensor 22.

Next, an operating routine of an occupant judgment according to the second embodiment of the present invention is described below with reference to a flow chart illustrated in FIG. 8. The operating routine is performed at a predetermined time of period.

An initial process is first performed by the CPU 26 at step 201 in the same manner as the first embodiment. At step 202, the CPU 26 calculates each output load value FR, FL, RR, RL based upon each load signal from each load sensor 21, 22, 23, 24 so as to be memorized by the memory (not shown). The CPU 26 further calculates the detected load value S by summing the output load value FR, FL, RR, RL. The detected load value S is memorized by the memory (not shown). The program then proceeds to step 203 for calculating an output load value RS by summing the output load value RR of the load sensor 23 and the output load value RL of the load sensor 24 and for memorizing the output load value RS by the memory. The program is followed by step 204. At step 204, the CPU 26 calculates a ratio r of the output load value RS at a rear side divided by the detected load value S. The ratio r is calculated to be a small value in a state where a center of gravity of the occupant is positioned at a front vicinity of the seat cushion 9 and is calculated to be a large value in a state where the center of gravity of the occupant is positioned at a rear vicinity thereof or around. Therefore, the ratio r is employed for judging whether or not the occupant is leaning on the seat back 10. The program proceeds to step 205 for judging whether or not the seat belt 11 is under a fastened condition. More specifically, the seat belt 11 is judged to be under the fastened condition when the signal detected by the seat belt switch 32 is ON and is judged not to be under the fastened condition when the signal detected by the seat belt switch 32 is OFF.

When the seat belt 11 is judged to be under the fastened condition at step 205, the program proceeds to step 206 for judging the occupant on the seat body 1 in the same manner as the first embodiment. When the detected load value S is equal to or great than the predetermined adult load value, the program proceeds to step 207 for judging whether or not the ratio r is equal to or greater than a predetermined value A. The predetermined value A is preset to be a preferable value for judging whether or not the occupant is leaning on the seat back 10 when an occupant is assumed to be sitting o the seat body 1.

When the ratio r is judged to be less than the predetermined value A, the CPU 26 judges that the occupant has not been leaning on the seat back 10 even if an occupant is assumed to be sitting on the seat body 1. In this case, the capacitance sensor 31 is not necessary for judging whether or not the human body is on the seat body 1. Therefore, the program proceeds to step 208 directly from step 207. At step 208, the CPU 26 judges that there is an adult occupant on the seat body 1 since a sufficiently large load value has been detected for judging to be an adult occupant. The judgment result is memorized by the memory and the program is terminated. When the CRS is provided on the seat body 1, the output load value RS is increased by the load for fastening the seat belt 11. Therefore, the CRS is assumed not be provided on the seat body 1 when the ratio r is less than the predetermined value A.

Figure 9A:
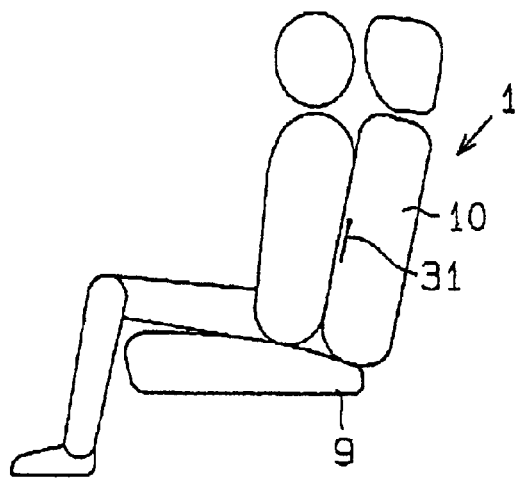
FIG. 9 is a schematic view illustrating a vehicle seat condition under each process based upon the flow chart illustrated in FIG. 8.
Figure 9B:
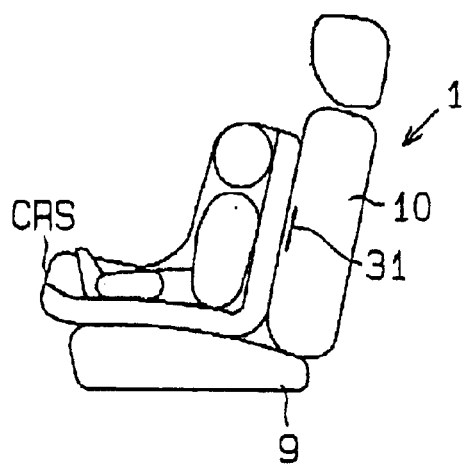
Figure 9C:
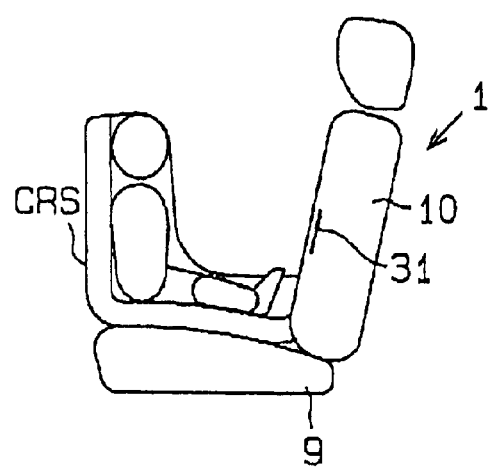

When the ratio r is judged to be equal to or greater than the predetermined value A, the CPU 26 judges that the occupant has been leaning on the seat back 10 if the occupant is assumed to be sitting on the seat body 1. In this case, the human body on the seat body 1 can be detected by the capacitance sensor 31. Therefore, the program proceeds to step 209 for judging whether or not a human body can be detected in the same manner as the first embodiment. When the human body is detected at step 209, the program proceeds to step 208 for judging to be an adult occupant. In this case, the sufficiently large load for judging to be an adult occupant has been detected. Further, the human body has been detected. Therefore, the CPU 26 judges an adult occupant sitting condition as illustrated in FIG. 9(*a*). The judgment result is memorized by the memory and the program is terminated.

On the other hand, when the CPU 26 judges that the human body is not detected at step 209, the program proceeds to step 210. At step 210, the CPU 26 judges at least that there is no human body on the seat body 1, and yet at least there is the child restraint system (CRS) provided thereon. In this case, although a sufficiently large load value for judging to be an adult occupant has been detected, a human body has not been detected. Therefore, the CPU 26 judges that a CRS has been provided on the seat body 1 in a vehicle forward direction as illustrated in FIG. 9(*b*) or judges that a CRS has been provided on the seat body 1 in a vehicle rearward direction as illustrated in FIG. 9(*c*). In this case, the CRS provided on the seat body 1 can be a convertible type to be switched in the vehicle forward and rearward directions as illustrated in FIG. 9(*b*) and in FIG. 9(*c*).

When the seat belt 11 is not judged to be under the fastened condition at step 205, the program proceeds to step 211 for judging an occupant on the vehicle seat body 1 in the same manner as step 206. When the detected load value S is equal to or greater than the predetermined adult occupant load value, the program directly proceeds to step 208 for judging to be an adult occupant. On the other hand, when the detected load value S is less than the predetermined adult occupant load value, the program proceeds to step 212. At step 212, the CPU 26 judges at least there is no human body on the seat body 1, and yet there is at least a child sitting on the seat body 1, the CRS or the carriage mounted thereon. Further, the CPU 26 judges at least that there is nothing being mounted on the seat body 1. The judgment result is memorized by the memory and the program is terminated.

As described above, the occupant judging apparatus according to the second embodiment can exert following effects in addition to one of the effects according to the first embodiment, in which the detection of the human body can be performed simply by detecting the capacitance.

The occupant judging apparatus according to the second embodiment can detect the human body being in contact with the seat back 10 by means of the capacitance sensor 31. Therefore, assuming that the detected load value S is increased by the load for fastening the seat belt 11 for fixing the CRS and the CPU 26 judges to be an adult occupant based upon the difference between the increased detected load value S and the load value for judging to be an adult occupant, the occupant judging apparatus according to the second embodiment can prevent misjudging an adult occupant unless the human body is detected by the capacitance sensor 31. Therefore, the occupant judging apparatus can restrain an occupant misjudgment.

According to the occupant judging apparatus according to the second embodiment, the human body can be detected when the output load value of the load sensors 23, 24 relative to the output load value of the load sensors 21, 22 is large, i.e. when the ratio r is equal to or greater than the predetermined value A. Generally, when the ratio r is equal to or greater than the predetermined value A in a state where there is an occupant on the seat body 1, the CPU 26 judges that there is a human body leaning on the seat back 10. Therefore, the capacitance sensor 31 detects the human body in this case. Therefore, the occupant judging apparatus according to the second embodiment can further prevent an occupant misjudgment by confirming the detection of the human body.

The present invention is not limited to the preferred embodiments above disclosed and can be modified as follow.

The occupant judging apparatus according to the first embodiment performs, the occupant judgment (step 104) sequentially after the human body is detected (step 103). However, the human body detection can be performed after the occupant judgment in which the detected load value is judged to be equal to or greater than the predetermined adult occupant load value.

According to the occupant judging apparatus of the second embodiment, the CPU 26 judges whether or not the occupant has lean on the seat back 10 based upon the ratio r of the output load value RS at the rear side relative to the detected load value S. However, the occupant can be judged whether or not being lean on the seat back 10 based upon a ratio of a output load value FS at a front side relative to the detected load value S. The output load value FS is calculated by summing the output load values FR, FL. Further, the judgment can be performed based upon a ratio between the output load value FS at the front side and the output load value RS at the rear side. As described above, other calculating methods can be applicable for performing the judgment as far as a ratio of the output load value at the rear side relative to the output load value at the front side can be calculated.

According to the occupant judging apparatus of the second embodiment, the front-right side load sensor 21 and a front-left side load sensor 22 are provided at the front portions of the seat body 1. The rear-right side load sensor 23 and the rear-left side load sensor 24 are provided at the rear portions of the seat body 1. However, the preferred arrangement of the four load sensors and the number of the provided load sensors are one of the examples. Therefore, the different number of the load sensors can be provided in a different manner as far as each load applied to the front portion of the seat body 1 and the rear portion thereof can be detected so as to judge whether or not the occupant has been lean on the seat back 10.

The capacitance sensors according to the first and second embodiments can be provided at the seat cushion 9 and the seat back 10, respectively. However, the capacitance sensor 31 can be provided at both seat cushion 9 and the seat back 10. Further, the human body detecting means for detecting the human body is not limited to the capacitance sensor and can be other detecting means as far as the human body can be detected.

According to the occupant judging apparatus of each embodiment, the front-right side load sensor 21 and a front-left side load sensor 22 are provided at the front portions of the seat body 1. The rear-right side load sensor 23 and the rear-left side load sensor 24 are provided at the rear portions of the seat body 1. However, the preferred arrangement of the four load sensors and the number of the provided load sensors are one of the examples. Therefore, the different number of the load sensors can be provided in a different manner as far as a single load sensor is provided at a predetermined position of the seat body 1 or as far as a plurality load sensors are provided at predetermined portions thereof so as to compare the detected load value of the load sensor with the predetermined judging threshold value.

The structure of each sensor bracket 7 8 according to each preferred embodiment is one of the examples. The structure thereof are arbitrary as far as the bracket is deformable in response to a seat load, i.e. a sitting load.

The portions for assembling the load sensors 21, 22, 23, 24 are one of the examples of each embodiment. The assembling portions can be arbitrary as far as the seat load, i.e. the sitting load can be detected.

The seat body 1 according to each embodiment is provided for the vehicle passenger seat. However, the seat body 1 can be provided for a driver seat.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An occupant judging apparatus, comprising:
    load detecting means assembled to a seat body for producing an output load value;
    a controller for calculating a detected load value based upon the output load value of the load detecting means and for performing an occupant judgment based upon a relationship between the detected load value and a predetermined judging threshold value; and
    human body detecting means for detecting a human body on the seat body, wherein based on output of the load detecting means and human body detecting means the controller differentiates at least between an occupant on the seat body and a child seat on the seat body, and in case of an occupant on the seat body whether the occupant is an adult or a child.

2. An occupant judging apparatus, according to claim 1, wherein the human body detecting means is provided at a seat cushion of the seat body.

3. An occupant judging apparatus, according to claim 1, wherein the human body detecting means is provided at a seat back of the seat body.

4. An occupant judging apparatus, according to claim 3, wherein the load detecting means comprises:
    a front load sensor for detecting a load applied to a front portion of the seat body; and
    a rear load sensor for detecting a load applied to a rear portion of the seat body, wherein the controller includes calculating means for calculating a ratio between an output load value of the rear load sensor and an output load value of the front load sensor, wherein the human detection is performed by the human body detecting means in response to the calculated ratio.

5. An occupant judging apparatus, according to claim 4, wherein the calculated ratio is a ratio of the output load value of the rear load sensor relative to the detected load value, wherein the human body can be detected when the calculated ratio reaches a predetermined value.

6. An occupant judging apparatus, according to claim 4, wherein the calculated ratio is a ratio of the output load value of the front load sensor relative to the detected load value, wherein the human body can be detected when the calculated ratio reaches a predetermined value.

7. An occupant judging apparatus, according to claim 4, wherein the calculated ratio is a ratio of the output load value of the rear load sensor relative to the output load value of the front load sensor, wherein the human body can be detected when the calculated ratio reaches a predetermined value.

8. An occupant judging apparatus, according to claim 1, wherein the human body detecting means is a capacitance sensor for detecting the human body on the seat body.

9. An occupant judging apparatus, according to claim 8, wherein the capacitance sensor is provided at a seat cushion for detecting the human body seated on the seat cushion.

10. An occupant judging apparatus, according to claim 4, wherein the human body detecting means is a capacitance sensor provided at a seat back.

11. A vehicle seat provided with an occupant judging apparatus, comprising:
    a supporting frame fixed to a vehicle floor;
    a lower rail supportably fixed to the supporting frame;
    an upper rail disposed in a groove defined in the lower rail so as to be slidably movable in a vehicle longitudinal direction;
    a lower arm connected to the upper rail by a deformable jointing portion and supporting a seat body comprising a seat cushion and a seat back;
    a load sensor assembled at the deformable jointing portion for outputting a load value corresponding to a load applied to the seat cushion based upon a deformed amount of the deformable jointing portion;
    a controller for calculating a detected load value based upon the output load value of the load sensor and for performing an occupant judgment based upon a relationship between the detected load value and a predetermined judging threshold value;
    a capacitance sensor for detecting a human body on the seat body, and
    the controller based on output of the load sensor and the capacitance sensor differentiating at least between an occupant on the seat and a child seat on the seat, and in case of an occupant on the seat whether the occupant is an adult or a child.

12. An occupant judging apparatus for a vehicle, according to claim 11, wherein the capacitance sensor is provided at the seat cushion.

13. An occupant judging apparatus for a vehicle, according to claim 11, wherein the capacitance sensor is provided at the seat back.

14. An occupant judging apparatus for a vehicle, according to claim 13,
    wherein the load sensor comprises:
        a front load sensor for detecting a load applied to a front portion of the seat body; and
        a rear load sensor for detecting a load applied to a rear portion of the seat body; and
    the controller including:
        calculating means for calculating a ratio between an output load value of the rear load sensor and an output load value of the front load sensor, wherein the human detection is performed by the human body detecting means in response to a relationship between the calculated ratio and a predetermined value.

15. An occupant judging apparatus, comprising:

load detecting means assembled to a seat body for producing an output load value;

a controller which calculates a detected load value based upon the output load value of the load detecting means and performs an occupant judgment based upon a relationship between the detected load value and a predetermined judging threshold value;

human body detecting means producing an output for detecting a human body on the seat body; and the controller differentiating between an adult on the seat body, a child on the seat body and a child seat on the seat body using output of the load detecting means and the human body detecting means.

16. An occupant judging apparatus, according to claim 15, wherein the human body detecting means is provided at a seat cushion of the seat body.

17. An occupant judging apparatus, according to claim 15, wherein the human body detecting means is provided at a seat back of the seat body.

18. An occupant judging apparatus, according to claim 15, wherein the load detecting means comprises:

a front load sensor which detects a load applied to a front portion of the seat body; and a rear load sensor which detects a load applied to a rear portion of the seat body, the controller including calculating means for calculating a ratio between an output load value of the rear load sensor and an output load value of the front load sensor, an wherein the human detection is performed by the human body detecting means in response to the calculated ratio.

19. An occupant judging apparatus, according to claim 15, wherein the human body detecting means is a capacitance sensor.

* * * * *